United States Patent [19]

Shimizu

[11] Patent Number: 5,220,306
[45] Date of Patent: Jun. 15, 1993

[54] DIGITAL SIGNAL COMPARATOR FOR COMPARING N-BIT BINARY SIGNALS

[75] Inventor: Shin Shimizu, Tokyo, Japan

[73] Assignee: Nippon Steel Corporation, Tokyo, Japan

[21] Appl. No.: 751,531

[22] Filed: Aug. 29, 1991

[30] Foreign Application Priority Data

Aug. 30, 1990 [JP] Japan ............................... 2-229770

[51] Int. Cl.$^5$ ............................ G06F 7/02; G06F 7/04
[52] U.S. Cl. ................................................. 340/146.2
[58] Field of Search ....................... 340/146.2; 364/769

[56] References Cited

U.S. PATENT DOCUMENTS

| | | | |
|---|---|---|---|
| 3,508,198 | 6/1967 | Coombs, Jr. et al. | 340/146.2 |
| 3,601,801 | 8/1971 | Sauvan | 340/146.2 |
| 3,836,908 | 9/1974 | Hegendorfer | 340/146.2 |
| 4,017,830 | 4/1977 | Shigemori et al. | 340/146.2 |
| 4,031,511 | 6/1977 | Britton | 340/146.2 |
| 4,109,141 | 8/1978 | Sasaki | 340/146.2 |
| 4,891,534 | 1/1990 | Kanoh | 340/146.2 |

OTHER PUBLICATIONS

Gautier et al., "Two-Bit Words Comparison Circuit" *IBM Tech. Disclosure Bulletin* vol. 18, No. 8 Jan. 1976 pp. 2544-2545.

Texas Instruments, Advanced Bipolar Logic Family Data Book pp. 4-658 to 4-665, 1990.

*Primary Examiner*—David H. Malzahn
*Attorney, Agent, or Firm*—Pollock, Vande Sande & Priddy

[57] ABSTRACT

A digital value comparator circuit for comparing in magnitude first and second digital values, each represented by n-bit binary signal (n is an integer larger than 1) is disclosed to comprise first and second signal converters for receiving the first and second digital signals, each converter including a parallel connection of first to n-th FETs with powers, respectively, $m^0, m^1, m^2, m^3, \ldots, m^{n-1}$ times (m is an integer larger than 1) of a predetermined power and having respective gates connected to the n bits of the supplied digital signal sequentially from its least significant bit, and an adder circuit for generating an output signal indicative of a sum of currents flowing through drain-source circuits of the first to n-th FETs, and a decision circuit connected to the first and second signal converters for comparing the output signals thereof and generating a signal representing the result of comparison.

17 Claims, 2 Drawing Sheets

DIGITAL SIGNAL COMPARATOR FOR COMPARING N-BIT BINARY SIGNALS

BACKGROUND OF THE INVENTION

1. Field of the Invention

The present invention relates to a circuit for comparing the magnitude of digital values.

2. Description of the Related Art

Various digital circuits use a circuit for comparing digital values as shown, for example, TEXAS INSTRUMENTS, ADVANCED BIPOLAR LOGIC FAMILY DATA BOOK, p.p. 4-658~4-665, 1990. One of such comparator circuits, for example, has a configuration as shown in FIG. 4. This circuit is for comparing the magnitude of values of digital signals A and B expressed in n-bit binary signals applied to terminals 40 and 42.

In this circuit, the digital signal A applied to the terminal 40 is supplied to an adder-subtractor circuit 44. The digital signal B applied to the terminal 42, on the other hand, is supplied to a complementation circuit 46 for converting the supplied signal to a complement of 2n. This conversion to a complement can be effected by inverting the binary signal "0" to "1" and "1" to "0" of each bit of a n-bit digital signal, adding "1" to the result of inversion, and deleting "1" which may be carried to the order of $2^n$. The adder-subtractor 44 adds the digital signal A and the complement of the digital signal B to each other, and produces "A-B". A decision circuit 48 decides that A>B, when the "A-B" is positive, and that A<B, when "A-B" is negative, and produces an output indicating the result of decision.

The conventional digital value comparator circuits including the one illustrated in FIG. 4 are configured of gate circuits in multiple stages. A signal is delayed each time it passes a gate circuit. A considerable delay, therefore, is unavoidable due to accumulation of delays before the final result of comparison is obtained after application of signals to be compared. Especially when using an adder-subtractor of a ripple carry type as the adder-subtractor 44 in FIG. 4, it takes a considerable time to transmit the carry information from the least significant bit to the most significant bit of the adder, thereby leading to disadvantage that the delay time is greatly increased with the number of bits.

Also, in the digital value comparator circuit shown in FIG. 4, the complementation circuit 46 and the decision circuit 48 require almost as many transistors as the number of bits of the digital value to be compared, and in addition, more than ten transistors per bit are required for making up the adder-subtractor circuit. For this reason, the number of all transistors required greatly increases as the number of bits of the digital value increases. Since the space occupied by large scale integration of the circuit elements increases greatly with the increase in the number of transistors as described above, high density and high integration are hampered.

SUMMARY OF THE INVENTION

The object of the present invention is to provide a digital value comparator circuit which solves the above-mentioned problems of the prior art and which is of high-density and high-integrated configuration with a reduced number of transistors arranged in a simple circuit configuration and without increasing the delay time as the number of bits of a digital signal to be compared increases.

A digital value comparator circuit for comparing the magnitude of two digital signals each represented by n-bit (wherein n is an integer larger than 1) binary signals according to the present invention comprises first and second signal converters supplied with first and second digital signals respectively. Each of the signal converters includes a parallel connection of first to n-th FETs with powers, respectively, $m^0, m^1, m^2, m^3, \ldots, m^{n-1}$ times (wherein m is an integer larger than 1) of a predetermined power and having respective gates connected to the n bits of the supplied digital signal sequentially from its least significant bit, and an adder circuit for generating a signal representing the sum of currents flowing in the drain-source circuits of the first to n-th FETs respectively. The digital value comparator circuit further comprises a decision circuit connected to the first and second signal converters for comparing output signals thereof and generating a signal indicating which of the output signals is larger.

In a preferred embodiment of the present invention, the value of m is 2.

According to the present invention with the above-mentioned configuration, when the bits of each digital signal are applied parallely to the gates of the FETs of each of the first and second signal converters, the FETs having the gates, each receiving a bit "1", are turned on so that a current flow in each of the FETs through its drain-source circuit corresponds to the power or conductance of the FET. Since the power of each FET is determined in the manner as mentioned above, the combined conductance of the parallel circuit of the FETs increases monotonously with increase in the value of the supplied digital signal. As a result, the combined conductance of each parallel circuit of the FETs is definitely determined depending on the value of the supplied digital signal so that each of the first and second signal converters produces an output voltage corresponding to the combined conductance thereof.

In accordance with the difference between the output voltages produced from the first and second signal converters, the decision circuit produces a "high" or "low" signal indicating which of the values of two digital signals applied to the first and second signal converters is larger.

Also, when the value of m is set to 2 so that the powers of the FETs of each signal converter are set to 1, 2, 4, ..., $2^{n-1}$ times of a predetermined power, respectively, the combined conductance of the parallel circuit of FETs increases linearly with increase of the value of the input digital signal. The actual handling is thus greatly facilitated.

DESCRIPTION OF THE PREFERRED EMBODIMENTS

An embodiment of the present invention in which the digital values to be compared are represented by four bits of a binary signal will be explained below with reference to the accompanying drawings.

Figure 1:
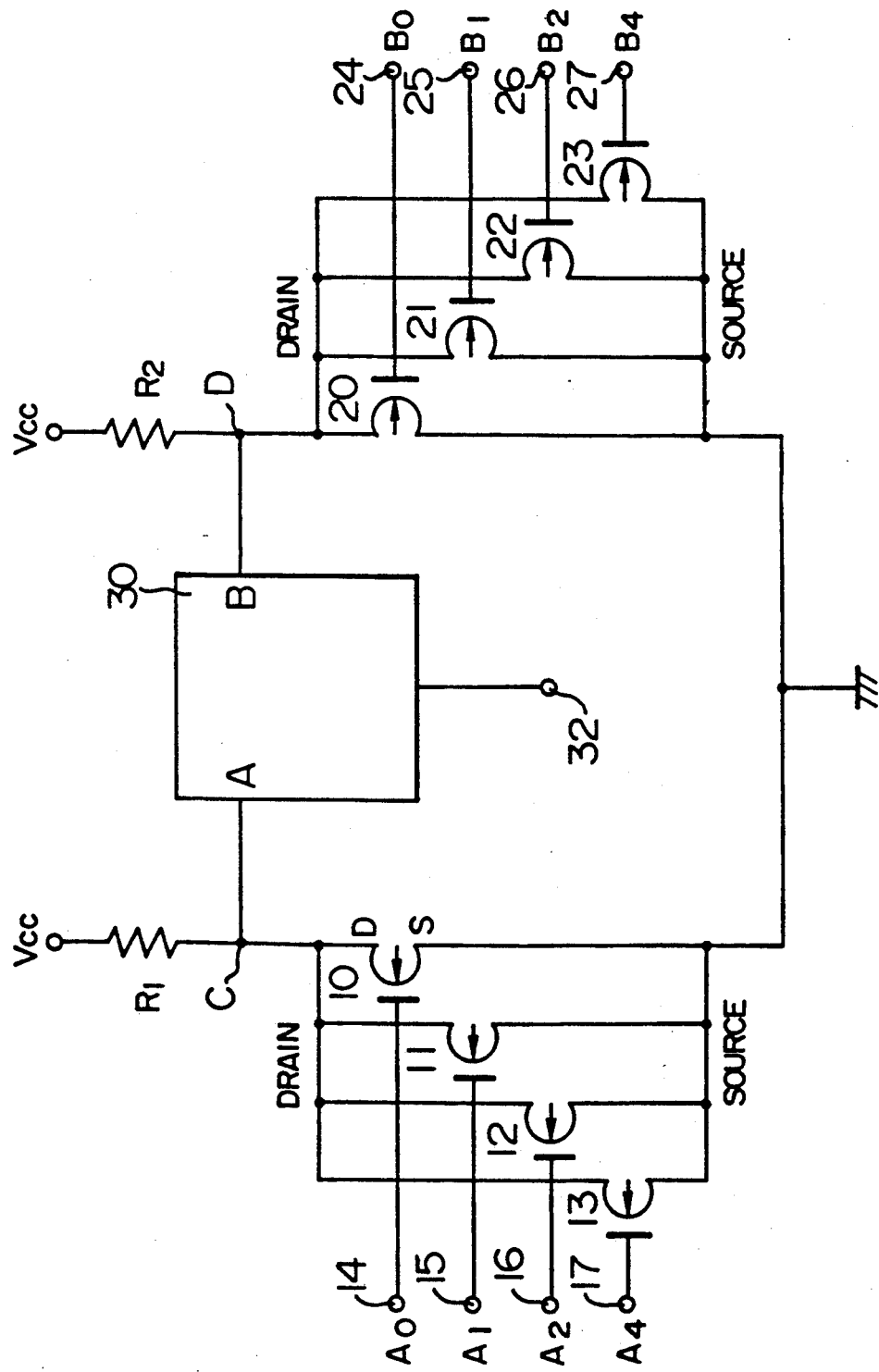
FIG. 1 is a block diagram showing a digital value comparator circuit according to an embodiment of the present invention.

In FIG. 1, four N-channel MOSFETs 10-13 on the left side are of enhancement-type, that is, normally non-conductive type and are operated at predetermined powers, respectively, as described later. The drain-source circuits of the MOSFETs 10-13 are connected in parallel to each other, and the gates thereof are connected to input terminals 14-17 respectively, thus configurating a signal converter circuit. In similar fashion, four enhancement-type MOSFETs 20-23 on the right side have the drain-source circuits connected in parallel to each other and gates thereof connected to input terminals 24-27 respectively. The powers of these MOSFETs are equal to those of the MOSFETs 10-13, respectively. These MOSFETs make up the other signal converter circuit.

Further, the drains of the MOSFETs 10-13 are connected to a common point C, which in turn is connected through a load resistor $R_1$ to a power supply Vcc on the one hand, and on the other hand to one of the inputs of a differential amplifier circuit 30 making up a decision circuit. In similar fashion, the MOSFETs 20-23 have the drains thereof connected to a common point D, which in turn is connected through a load resistor $R_2$ of the same value as $R_1$ to the power supply Vcc. The resistor $R_1$ or $R_2$ and the parallel-connected FETs configure an adder circuit, and a voltage signal indicative of the sum of the currents flowing in the drain-source circuits of the four FETs is generated at the point C or D. The result of comparing the magnitude of the values of the digital signals is produced from the output terminal 32 of the differential amplifier circuit 30.

Now, the relationship between the powers, that is, the drain-source conductances of the MOSFETs 10-13 and 20-23 in turned-on state will be explained. When the conductance of each of the MOSFETs 10 and 20 is represented by g, the respective MOSFETs are formed to have the following conductances, respectively.

| MOSFET 10, 20 | g |
| MOSFET 11, 21 | 2g |
| MOSFET 12, 22 | 4g |
| MOSFET 13, 23 | 8g |

Specifically, the conductances of the MOSFETs of the signal input circuits are $2^0$, $2^1$, $2^2$ and $2^3$ times as large as g in the order of power thereof.

Figure 2:
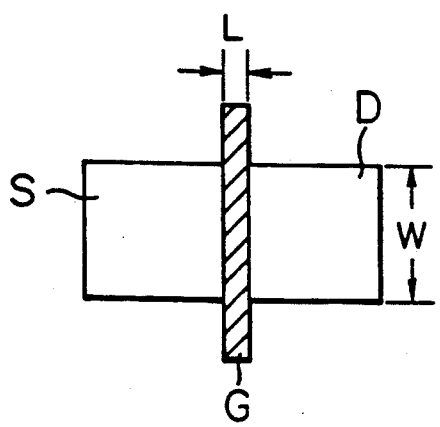
FIG. 2 is a diagram schematically showing the configuration of a MOSFET.

In order to set the conductances of the MOSFETs to these values, the gate width is controlled at the time of manufacture. More specifically, the structure of an FET is roughly shown in FIG. 2. When the channel length L is assumed to be constant, the conductance is proportional to the gate width w. When a MOSFET is fabricated in integrated structure, therefore, the gate width W is changed in accordance with the desired conductance. As a result, MOSFETs having a predetermined conductance can be formed in a lot.

When the bits of a 4-bit digital signal are applied in parallel to the gates of the MOSFETs 10-13 or 20-23 having the above-mentioned conductances, only the MOSFETs that have been supplied with a bit of "1" (high level) are turned on, thus contributing to the combined conductance. In the case where the digital signal A applied to the MOSFETs 10-13 holds the relation $(A_3, A_2, A_1, A_0) = (1011)$, for example, the MOSFETs 13, 11 and 10 are turned on, and the MOSFET 12 is turned off. As a result, the prevailing combined conductance is 11 g. Also, in the case where the digital signal B applied to the MOSFETs 20-23 satisfies the relation $(B_3, B_2, B_1, B_0) = (1000)$, the MOSFET 23 is turned on and the MOSFETs 22, 21 and 20 are turned off. The combined conductance is thus given as 8 g.

Figure 3:
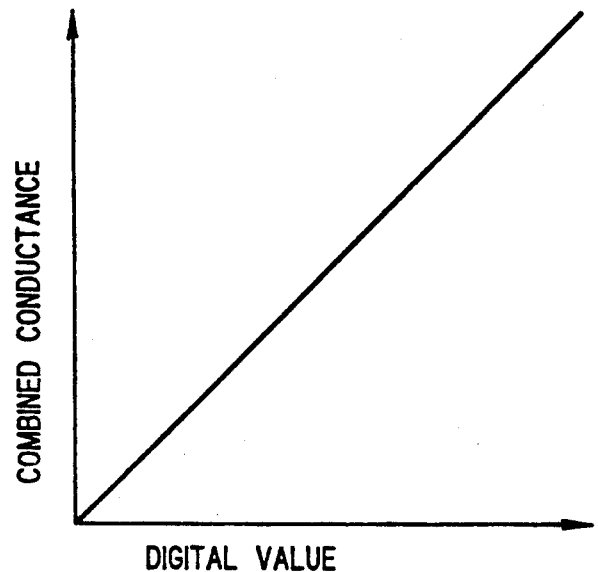
FIG. 3 is a graph showing the relationship between the combined conductance of an FET circuit used in the circuit of FIG. 1 and an input digital signal.

The reason why the conductances of the MOSFETs are arranged in multiples by powers of 2 is that the combined conductance increases linearly as shown in FIG. 3 with increase of the input digital signal. As a result, the input digital signal determines definitely the value of the combined conductance.

When the digital signal A is applied to the input terminals 14 to 17 in this way, the current supplied from the power supply Vcc flows through a resistor $R_1$ in accordance with the value of the combined conductance of the MOSFETs 10-13. The potential at the point C is thus definitely determined by the value of the input digital signal A. In similar fashion, the potential at the point D is determined definitely by the value of the digital signal B applied to the input terminals 24-27. The potentials at points C and D make up an input voltage to the differential amplifier circuit 30, which produces a signal corresponding to the voltage difference between the two inputs at the output terminal 32. This signal is used to decide the relationship of magnitude between digital signals A and B. A signal of "0" or "1" may alternatively be produced in accordance with the polarity of this signal.

Figure 4:
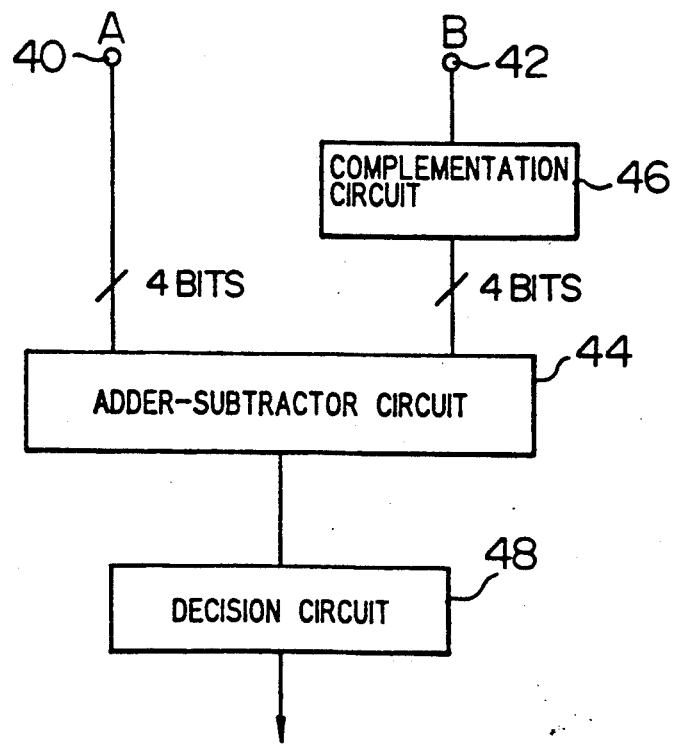
FIG. 4 is a block diagram showing the configuration of a conventional digital value comparator circuit.

The most significant feature of the digital value comparator circuit configured as shown in FIG. 1 is that the bits of each digital signal are applied parallely to the gates of each MOSFET circuit and the result of comparison is obtainable immediately. The circuit shown in FIG. 1 does not require any complementation circuit or adder-subtractor circuit unlike the conventional circuits as shown in FIG. 4, and therefore involves no problem due to the delay of the signal for passing through each gate. In particular, no time is required at all for transmission of the carry information in an adder-subtractor circuit, and therefore even if the number of bits of the input signal is increased, the advantage is that the delay time remains substantially unchanged.

Assuming that the constant-current circuit making up the differential amplifier circuit in FIG. 1 is of current mirror type, there are required at most 4 to 5 transistors for the differential amplifier circuit. In addition, only transistors corresponding to the number of signal bits are required in the two signal input circuits. The total number of transistors does not increase with the increase in the number of bits of the input signal unlike in the conventional circuit shown in FIG. 4. Therefore, the number of transistors required is greatly reduced as compared with the conventional circuit. As a result, the space necessary for large scale integration of the circuit shown in FIG. 1 is minimized, thereby contributing to a higher density and integration of the circuit.

The present invention is not limited to four bits of input signal as in the present embodiment, but may be applicable to an input signal of other numbers of bits such as eight or 16 bits without substantially affecting the delay time.

Also, unlike in the present embodiment in which the conductances of the MOSFETs in each MOSFET parallel circuit are arranged in a series of multiples by powers of 2, the present invention is not limited to such an arrangement but the conductances may be arranged in a series of multiples by powers of a number more than two, in which case the conductance of each MOSFET parallel circuit is determined definitely correspondingly to the value of the input digital signal.

It will thus be understood from the foregoing description that according to the present invention there is no need of using a complementation or adder-subtractor circuit which may cause a signal delay. As a result, the result of comparison of digital values can be obtained with high-speed operation. In addition, the processing time substantially remains unchanged with the increase in the number of bits. Also, the absence of complementation and adder-subtractor circuits permits the reduction in the total number of transistors required for circuit configuration, thereby providing a digital value comparator circuit capable of high density and integrity in large scale circuit integration.

I claim:

1. A digital value comparator circuit for comparing magnitudes of first and second digital signals, each signal being an n-bit binary signal (wherein n is an integer larger than 1), said comparator comprising:

first and second signal converter means for receiving and converting said first and second n-bit digital signals into corresponding first and second analog signals respectively, each converter means including a parallel connection of first to n-th FETs, each FET having a drain-source circuit and a gate, and an adder circuit, said drain-source circuit and a gate, and an adder circuit, said drain-source circuits of the first to n-th FETs of each converter means having conductance values, respectively, $m^0$, $m^1$, $m^2$, $m^3$, ..., $m^{n-1}$ times (wherein m is an integer larger than 1) of the conductance value of the first FET, said gates of the first to n-th FETs of each converter means being connected to n bits of the received digital signal sequentially from its least significant bit, and said adder circuit being connected to the drain-source circuits of said adder circuit being connected to the drain-source circuits of said first to n-th FETs of each converter means for generating an output signal indicative of a sum of currents flowing through said drain-source circuits of the first to n-th FETs, so that said output signal represents the analog signal corresponding to the received n-bit digital signal; and decision means connected to the first and second signal converter means for comparing the output signals generated from the respective adder circuits of said first and second converter means with each other and generating a signal representing a result of the comparison.

2. A digital value comparator circuit according to claim 1, wherein said decision means generates a signal representing a difference between the output signals of the first and second signal converter means.

3. A digital value comparator circuit according to claim 1, wherein said decision means generates a signal representing which of the output signals of the first and second signal converter means is larger.

4. A digital value comparator circuit according to claim 1, wherein said FETs are MOSFETs.

5. A digital value comparator circuit according to claim 4, wherein each of the MOSFETs is provided with a gate area proportional to the conductance value of its drain-source.

6. A digital value comparator circuit according to claim 1, wherein the value of m is 2.

7. A digital value comparator circuit for comparing magnitudes of first and second digital signals, each signal being an n-bit binary signal (wherein n is an integer larger than 1), comprising:

first and second converter means for receiving and converting said first and second digital signals, into corresponding first and second analog signals, respectively, each converter means including a parallel connection of first to n-th switching elements, each element having an input terminal and a conductance circuit which is rendered conductive with application of an input signal having a predetermined signal level to said input terminal, and output means, said conductance circuits of the first to n-th switching elements of each converter means having conductance values, respectively, $m^0 = 1$, $m^1$, $m^2$, $m^3$, ..., $m^{n-1}$ times (wherein m is an integer larger than 1) of the conductance value of the conductance circuit of the first switching element, said input terminals of the first to n-th switching elements of each converter means being connected to n bits of the received n-bit digital signal sequentially from its least significant bit, and said output means of each converter means being connected to conductance circuits of said first to n-th switching elements of that converter means for generating an output signal indicative of a sum of currents flowing through said conductance circuits of said first to n-th switching elements, so that said output signal represents the analog signal corresponding to the received n-bit digital signal; and means for comparing the output signals generated from the respective output means of said first and second converter means with each other and generating a signal representing a result of the comparison.

8. A digital value comparator circuit according to claim 7, wherein said comparing and generating means generates a signal representing a difference between the output signals of the first and second signal receiving means.

9. A digital value comparator circuit according to claim 7, wherein said comparing and generating means generates a signal representing which of the output signals of the first and second signal receiving means is larger.

10. A digital value comparator circuit according to claim 7, wherein each of said first to n-th switching means is a MOSFET.

11. A digital value comparator circuit according to claim 7, wherein the value of m is 2.

12. A digital value comparator circuit for comparing magnitudes of first and second digital signals, each signal being an n-bit binary signal (wherein n is an integer larger than 1), comprising:

first and second converter means for receiving and converting said first and second n-bit digital signals, into first and second analog signals, respectively, each converter means including a parallel connection of first to n-th FETs, each FET having a drain-source circuit and a gate, and an adder circuit, said drain-source circuits of the first to n-th FETs of each converter means having predetermined different gate areas so as to provide the drain-source circuits of the respective FETs with predetermined different conductance values, respectively, and being connected to n bits of the received digital signal sequentially from its least significant bit, said adder circuit being connected to the drain-source circuits of said first to n-th FETs of each converter means for generating an output signal indicative of a sum of currents flowing through said drain-source circuits of the first to n-th FETs, so that said output signal represents the analog signal corresponding to the received n-bit digital signal; and decision means connected to the first and second signal converter means for comparing the output signals generated from the respective adder circuits of said first and second converter means with each other and generating a signal representing a result of the comparison.

13. A digital value comparator circuit according to claim 12, wherein conductance values of the drain-source circuits of the first to n-th FETs are respectively, $m^0=1, m^1, m^2, m^3, \ldots, m^{n-1}$ times (wherein m is an integer larger than 1) of the conductance value of the drain-source circuit of the first FET.

14. A digital value comparator circuit according to claim 12, wherein said decision means generates a signal representing a difference between the output signals of the respective adder circuits of the first and second converter means.

15. A digital value comparator according to claim 12, wherein said decision means generates a signal representing which of the output signals of the respective adder circuits of the first and second converter means is larger.

16. A value comparator circuit according to claim 12, wherein said FETs are MOSFETs.

17. A digital value comparator circuit according to claim 12, wherein the value of m is 2.

* * * * *